(12) United States Patent
Shin et al.

(10) Patent No.: US 11,214,108 B2
(45) Date of Patent: Jan. 4, 2022

(54) SUSPENSION SYSTEM FOR VEHICLE

(71) Applicants:Hyundai Motor Company, Seoul (KR); Kia Motors Corporation, Seoul (KR); Seoul National University R&DB Foundation, Seoul (KR)

(72) Inventors: Dongil Shin, Seoul (KR); Sang Min Han, Seoul (KR); Suh In Kim, Gwacheon-Si (KR); Seok Won Kang, Gwangju-Si (KR); Yoon Young Kim, Seoul (KR); Yong Sub Yi, Suwon-Si (KR); Seungmin Kwon, Seoul (KR); Seung Hoon Woo, Seongnam-Si (KR)

(73) Assignees: Hyundai Motor Company, Seoul (KR); Kia Motors Corporation, Seoul (KR); Seoul National University R&DB Foundation, Seoul (KR)

( * ) Notice: Subject to any disclaimer, the term of this patent is extended or adjusted under 35 U.S.C. 154(b) by 153 days.

(21) Appl. No.: 16/679,001

(22) Filed: Nov. 8, 2019

(65) Prior Publication Data

US 2020/0189341 A1    Jun. 18, 2020

(30) Foreign Application Priority Data

Dec. 13, 2018   (KR) ........................ 10-2018-0161198

(51) Int. Cl.
*B60G 3/20*      (2006.01)
*B60G 99/00*     (2010.01)

(52) U.S. Cl.
CPC ............ *B60G 3/20* (2013.01); *B60G 99/002* (2013.01); *B60G 2200/462* (2013.01); *B60G 2204/143* (2013.01); *B60G 2400/05144* (2013.01)

(58) Field of Classification Search
None
See application file for complete search history.

(56) References Cited

U.S. PATENT DOCUMENTS

| 4,840,396 | A | * | 6/1989 | Kubo | B60G 3/202 |
| | | | | | 280/124.143 |
| 5,026,090 | A | * | 6/1991 | Sekino | B62D 17/00 |
| | | | | | 267/189 |
| 5,415,426 | A | * | 5/1995 | Strasser | B60G 3/18 |
| | | | | | 280/124.136 |
| 8,662,510 | B2 | * | 3/2014 | Christensen | B60G 7/02 |
| | | | | | 280/124.148 |
| 2020/0189342 | A1 | * | 6/2020 | Shin | B60G 3/20 |

\* cited by examiner

*Primary Examiner* — Faye M Fleming
(74) *Attorney, Agent, or Firm* — Morgan, Lewis & Bockius LLP (57) ABSTRACT

A suspension system for a vehicle may include a knuckle configured of rotatably supporting a wheel, and a lower control arm mounted along a vehicle's width direction and connecting the knuckle and a vehicle body, wherein the lower control arm may include a wheel-side end portion connected to a lower portion of the knuckle through a lower external joint, a vehicle body-side front end portion connected to the vehicle body through a front lower inner joint, and a vehicle body-side rear end portion connected to the vehicle body through a rear lower inner joint, wherein one of the vehicle body-side front and rear end portions is connected to a portion of the vehicle body through a compliance control arm.

18 Claims, 6 Drawing Sheets

SUSPENSION SYSTEM FOR VEHICLE

CROSS-REFERENCE TO RELATED APPLICATION

The present application claims priority to Korean Patent Application No. 10-2018-0161198 filed on Dec. 13, 2018, the entire contents of which is incorporated herein for all purposes by this reference.

BACKGROUND OF THE INVENTION

Field of the Invention

The present invention relates to a suspension system for a vehicle.

Description of Related Art

A vehicle is typically provided with a suspension system between a drive axle and a vehicle body, as an apparatus configured for enhancing ride comfort and/or driving stability by reducing an impact or vibration transferred from a road surface while running of the vehicle.

Such a suspension system provides several functions of a vehicle. The suspension system provides ride comfort by cutting off an irregular impact input from a road surface from transmitting to a vehicle body. The suspension system also provides driving convenience by appropriately controlling wavering motion of the vehicle body caused by driving input of a driver or by an uneven road surface. The suspension system also provides driving traction of tires in cornering, braking, and acceleration by maintaining an appropriate vertical load on a tire contact surface.

To provide an optimized function of the suspension, controlling wheel alignment, e.g., tow-in and/or camber, plays an important role by suspension geometry characteristics. The direction of a wheel depends on relative motion to a vehicle body, and varying direction of a wheel affects an overall performance of a vehicle.

As an example of typical suspension, a multi-link type suspension employs at least three links as suspension components, to kinematically absorb an impact input from a road surface and wavering motion of a vehicle body.

Although such a multi-link type suspension actually achieves improvement in performance in comparison to classic suspensions, the multi-link type suspension also has limitation in optimally controlling the wheel alignment. The multi-link type suspension also show drawbacks in that, since a plurality of links may be included in a limited space, production cost increases due to increased number of parts, and spatial efficiency becomes deteriorated.

A double wishbone type suspension or a MacPherson strut type suspension may show better spatial efficiency compared to the multi-link type suspension. However, the double wishbone type suspension or a MacPherson strut type suspension may show a drawback of difficulty in tow-in control and lateral stiffness when applied with a lateral force and/or a braking force.

In the case of a suspension having an A-arm that has a single knuckle-side connection points and two vehicle body-side connection points, lateral stiffness may deteriorate although tow-in characteristics may be realized when applied with a lateral force and/or a braking force.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a suspension for a vehicle having an advantage of improved tow-in characteristics in a response to lateral and braking forces while minimizing a change in lateral stiffness.

A suspension for a vehicle according to an exemplary embodiment of the present invention may include a knuckle configured of rotatably supporting a wheel, and at least one control arm mounted along a vehicle's width direction and connecting the knuckle and a vehicle body, the at least one control arm including a lower control arm mounted between the knuckle and the vehicle body. The lower control arm may include a wheel-side end portion connected to a lower portion of the knuckle through a lower external joint, a vehicle body-side front end portion connected to the vehicle body through a front lower inner joint, and a vehicle body-side rear end portion connected to the vehicle body through a rear lower inner joint. One of the vehicle body-side front and rear end portions is connected to a portion of the vehicle body through a compliance control arm.

The at least one control arm may further include an upper control arm.

The vehicle body-side front end portion of the lower control arm may be connected to the vehicle body by the compliance control arm.

A first end portion of the compliance control arm may be connected to the vehicle body through the front lower inner joint. Two wheel-side end portions of the compliance control arm may be connected, through two compliance joints, to two connection portions bifurcated from the vehicle body-side front end portion of the lower control arm.

An arrangement direction of the rear lower inner joint and an arrangement direction of the compliance control arm may be aligned such that an instantaneous rotation center of the lower control arm is located external and rearward of the wheel center.

The two compliance joints may include upper and lower compliance joints that are vertically apart with respect to each other.

The lower control arm and the compliance control arm may relatively rotate with respect to each other around an axis connecting the upper and lower compliance joints.

In another exemplary embodiment of the present invention, the vehicle body-side rear end portion of the lower control arm may be connected to the vehicle body by the compliance control arm.

A first end portion of the compliance control arm may be connected to the vehicle body through the rear lower inner joint. Two wheel-side end portions of the compliance control arm may be connected, through the two compliance joints, to two connection portions bifurcated from the vehicle body-side rear end portion of the lower control arm.

An arrangement direction of the front lower inner joint and an arrangement direction of the compliance control arm may be aligned such that an instantaneous rotation center of the lower control arm is located external and rearward of the wheel center.

The two compliance joints may include upper and lower compliance joints that are vertically apart with respect to each other.

The lower control arm and the compliance control arm may relatively rotate with respect to each other around an axis connecting the upper and lower compliance joints.

Each of the two compliance joints may include a ball joint or a bushing.

The lower control arm may be formed as an A-arm by the wheel-side end portion and the vehicle body-side front and rear end portions.

Each of the front lower inner joint and the rear lower inner joint may include a bushing or a ball joint.

According to a suspension system for a vehicle according to an exemplary embodiment of the present invention, the lower control arm may be adjusted by dynamic characteristics of the compliance control arm when a lateral force and/or a braking force (longitudinal force) are applied to the wheel. Therefore, more design degree of freedom may be obtained in designing compliance steer characteristics since desired tow-in behavior characteristics may be achieved while maintaining lateral stiffness.

Furthermore, a suspension system for a vehicle according to an exemplary embodiment of the present invention, a relative motion between the lower control arm and the compliance control arm is not caused when the wheel WH experience a vertical movement causing low deformation of bushings as in bounce and rebound motion. Therefore, a compliance behavior of a vehicle may be separately improved without altering vertical kinematic behavior of the wheel.

Furthermore, effects which may be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Figure 1:
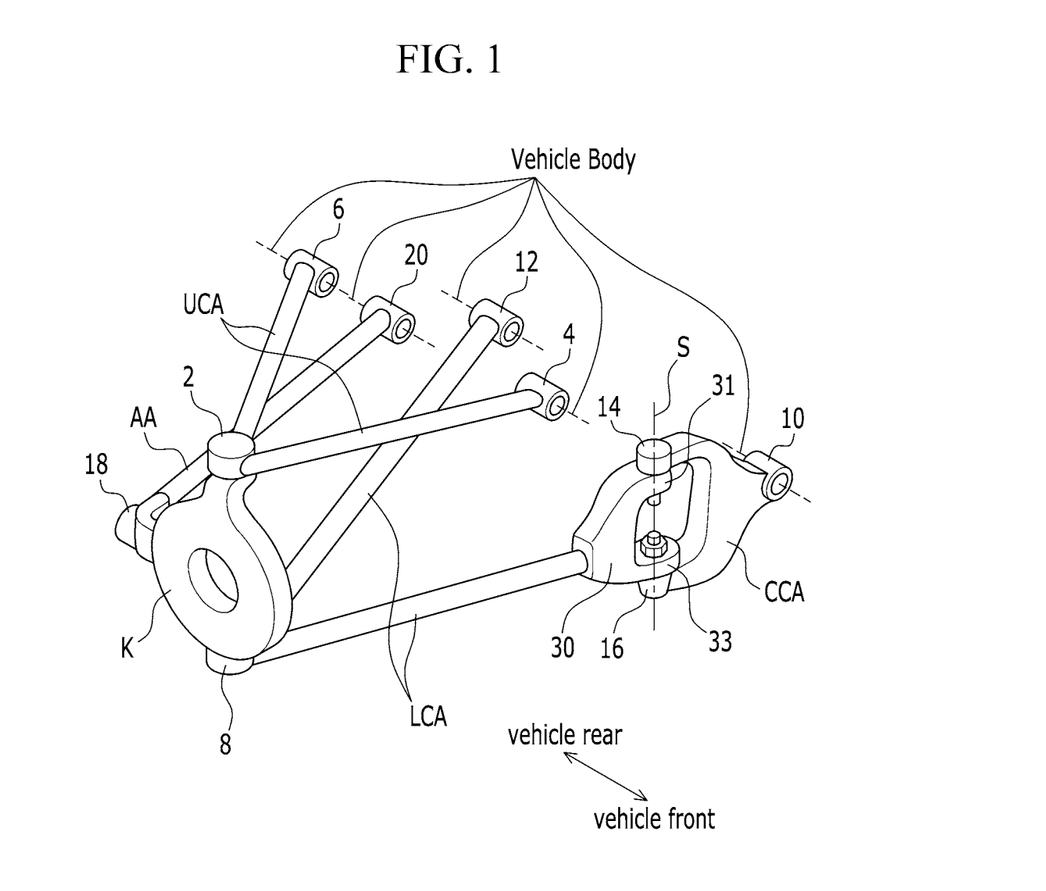
FIG. 1 is a perspective view of a suspension system for a vehicle according to various exemplary embodiments of the present invention.

FIG. 1 is a perspective view of a suspension system for a vehicle according to various exemplary embodiments of the present invention.

Referring to FIG. 1, a suspension system for a vehicle according to various exemplary embodiments of the present invention is a double wishbone type suspension.

A suspension system for a vehicle according to various exemplary embodiments of the present invention includes a knuckle K, an upper control arm UCA, a lower control arm LCA, a compliance control arm CCA, and an assist arm AA. The suspension system also includes a damping device including a coil spring and a shock absorber.

A suspension system for a vehicle according to various exemplary embodiments of the present invention is not limited to a specific double wishbone type suspension, but may be applicable to another type of suspension, e.g., a MacPherson strut type suspension or a wishbone type suspension, having a lower control arm (or a lower arm) LCA to which a compliance control arm CCA is applicable.

The knuckle K rotatably supports a wheel WH.

The upper control arm UCA may be formed as a single arm or two arms, and is realized as an A-arm in the various exemplary embodiments of the present invention.

The upper control arm UCA is mounted in a vehicle's width direction thereof. A wheel-side end portion of the upper control arm UCA is connected to an upper end portion of the knuckle K to form an upper external joint 2, and a vehicle body side both vehicle body-side end portions is connected to a vehicle body in a vehicle length direction to form a front upper inner joint 4 and a rear upper inner joint 6.

The lower control arm LCA may be formed as a single arm or two arms, the same as in the upper control arm UCA, and is realized as an A-arm in the various exemplary embodiments of the present invention.

Although the various exemplary embodiments of the present invention utilizes an A-arm as the lower control arm LCA, it may be understood that the present invention is not limited thereto, and the compliance control arm CCA may be applicable to an H-arm having two connection points at a knuckle side and two connections points at a vehicle body side.

The lower control arm LCA is mounted in a vehicle's width direction. A wheel-side end portion of the lower control arm LCA is connected to a lower portion of the knuckle K through a lower external joint 8. A vehicle body-side rear end portion among two vehicle body-side end portions of the lower control arm LCA is connected to the vehicle body through a rear lower inner joint 12.

The lower control arm LCA is mounted in a vehicle's width direction. The compliance control arm CCA is connected to a vehicle body-side front end portion among two vehicle body-side end portions of the lower control arm LCA, through two compliance joints 14 and 16 vertically spaced apart. A vehicle body-side end portion of the compliance control arm CCA is connected to the vehicle body through a front lower inner joint 10.

The two compliance joints 14 and 16 include an upper compliance joint 14 and a lower compliance joint 16. The vehicle body-side front end portion of the lower control arm LCA and the wheel-side end portion of the compliance control arm CCA is interconnected to each other through the upper and lower compliance joints 14 and 16.

In more detail, the front lower inner joint 10 is formed at the vehicle body-side end portion of the compliance control arm CCA, and the compliance control arm CCA is connected to the vehicle body through the front lower inner joint 10.

A wheel-side end portion of the compliance control arm CCA is bifurcated from the vehicle body-side end portion and forms the upper and lower compliance joints 14 and 16 that are vertically spaced apart.

A connection member 30 is fixed to the vehicle body-side front end portion of the lower control arm LCA, and the connection member 30 includes two connection portions 31 and 33 vertically spaced apart.

The compliance control arm CCA is connected to two connection portions 31 and 33 of the connection member 30 through the upper and lower compliance joints 14 and 16. The upper and lower compliance joints 14 and 16 form an axis S, and the compliance control arm CCA and the lower control arm LCA may relatively move about the axis S.

The upper and lower compliance joints 14 and 16 may be respectively formed as ball joints, however, are not limited thereto. Another element such as a bushing which may deform to vary an angle between the lower control arm LCA and the compliance control arm CCA about the axis S may be applicable as the upper and lower compliance joints 14 and 16.

The assist arm AA may be formed as a single arm. The assist arm AA is mounted at a rear portion of the knuckle K and mounted in a vehicle's width direction. A wheel-side end portion of the assist arm AA is connected to a rear middle portion of the knuckle K through an external joint 18. A vehicle body-side end portion of the assist arm AA is connected to the vehicle body through an inner joint 20.

Each of the joints may be realized as a bushing or a ball joint. In an exemplary embodiment of the present invention, the drawings illustrate that ball joints are used for external joints 2, 8, and 18 of the upper control arm UCA, the lower control arm LCA, and the assist arm AA, and the upper and lower compliance joints 14 and 16.

Furthermore, the drawings illustrate that bushings are used for inner joints 4, 6, 12, and 20 of the upper control arm UCA, the lower control arm LCA, and the assist arm AA and the front inner joint 10 of the compliance control arm CCA.

As known in the art, a bushing includes a rubber material fitted between internal and external pipes of smaller and larger diameters, and such a bushing absorbs a load exerted to the wheel in length and width directions of a vehicle by deforming of the rubber material.

As known in the art, a ball joint includes a stud having a metal ball integrally formed with a rod and a socket spherically contacting with the metal ball. In such a ball joint, the metal ball is rotatable with respect to the socket to provide relative motion of portions linked by the ball joint, and provides high strength against an applied force.

Figure 2:
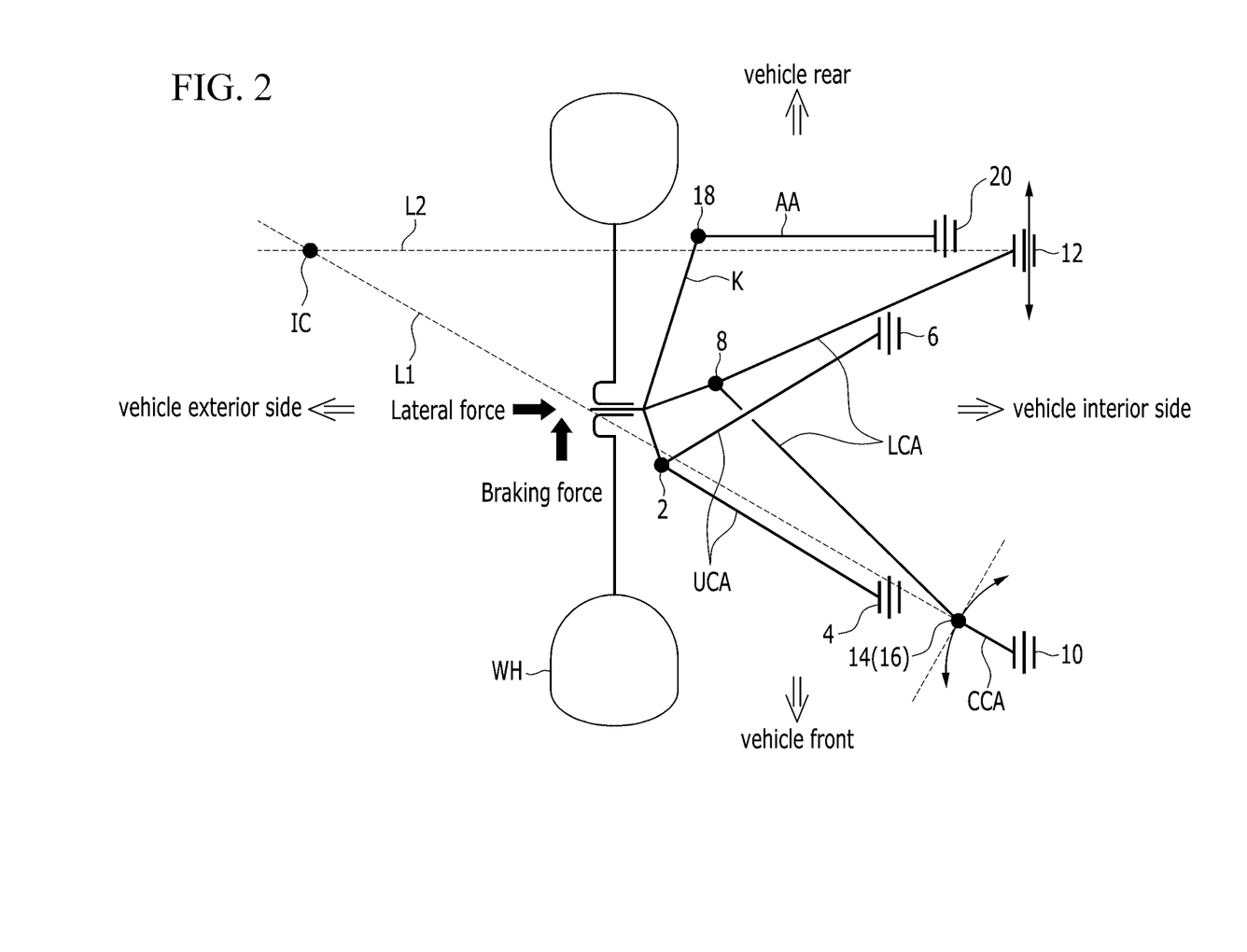
FIG. 2 is a schematic plan view of a suspension system for a vehicle according to various exemplary embodiments of the present invention.
Figure 3:
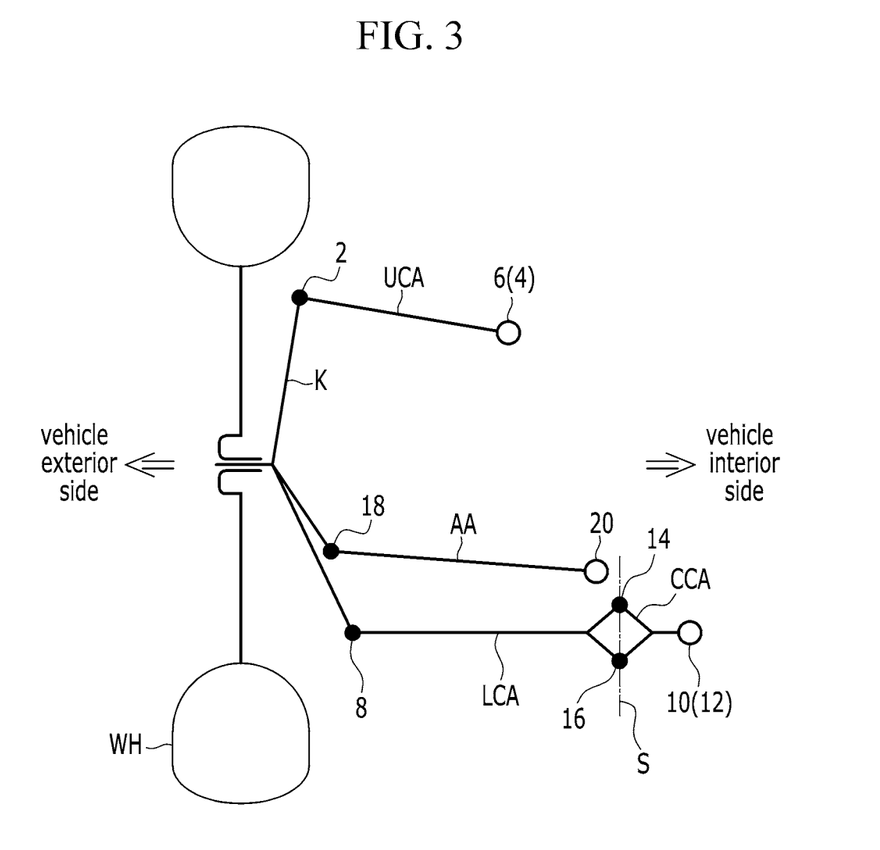
FIG. 3 is a schematic front view of a suspension system for a vehicle according to various exemplary embodiments of the present invention.

FIG. 2 is a schematic plan view of a suspension system for a vehicle according to various exemplary embodiments of the present invention. FIG. 3 is a schematic front view of a suspension system for a vehicle according to various exemplary embodiments of the present invention.

Referring to FIG. 2 and FIG. 3, the compliance dynamic characteristics of the wheel WH may be estimated based on an instantaneous rotation center IC of the lower control arm LCA. To increase tow-in behavior characteristics of the wheel WH while the lateral force and the braking force act on the wheel WH, an instantaneous rotation center IC of the lower control arm LCA is located external rear of the wheel WH.

The instantaneous rotation center IC of the lower control arm LCA is determined by the arrangement direction of the rear lower inner joint 12 and the arrangement direction and location of the compliance control arm CCA.

The upper and lower compliance joints 14 and 16 may rotationally move around the front lower inner joint 10 which is a front-side connection portion to the vehicle body. That is, the upper and lower compliance joints 14 and 16 may move in a direction perpendicular to a plane formed by the upper and lower compliance joints 14 and 16 and the front lower inner joint 10, as illustrated by an arrow across the upper and lower compliance joints 14 and 16. That is, the upper and lower compliance joints 14 and 16 instantaneously move vertically to an extension line L1 formed by the compliance control arm CCA.

The rear lower inner joint 12 forming the rear-side connection portion to the vehicle body may move along an axial direction of a bushing mounted therein, as illustrated by a straight arrow across the rear lower inner joint 12. That is, the front lower inner joint 10 instantaneously moves vertically to an extension line L1 formed vertical to the axial direction of the front lower inner joint 10.

When an external force such as a lateral force or a braking force is applied to wheel WH, the lower control arm LCA may move according to compliance dynamic characteristics determined by the front-side and rear-side connection portions to the vehicle body.

In the instant case, the instantaneous rotation center IC of the lower control arm LCA is formed at a point where the two extension lines L1 and L2.

As described above, according to a suspension system for a vehicle according to various exemplary embodiments of the present invention, the instantaneous rotation center IC of the lower control arm LCA may be located to a desired location, by appropriately designing an arrangement direction of the rear lower inner joint 12 and an arrangement direction of the compliance control arm CCA. Furthermore, desired compliance dynamic characteristics of the wheel WH may be obtained by appropriately locating the instantaneous rotation center IC of the lower control arm LCA.

When the wheel WH experience a vertical movement causing low deformation of bushings as in bounce and rebound motion, a relative motion between the lower control arm LCA and the compliance control arm CCA is not caused.

Figure 4:
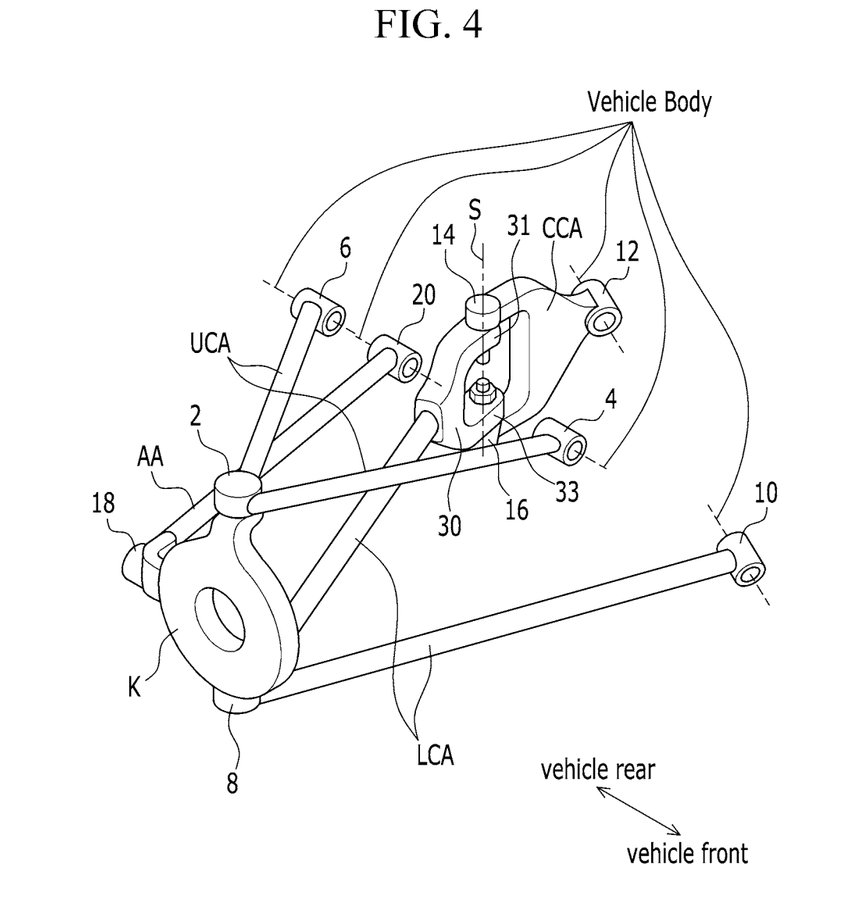
FIG. 4 is a perspective view of a suspension system for a vehicle according to various exemplary embodiments of the present invention.

FIG. 4 is a perspective view of a suspension system for a vehicle according to various exemplary embodiments of the present invention.

Referring to FIG. 4, a suspension system for a vehicle according to various exemplary embodiments of the present invention is a double wishbone type suspension, the same as in the various exemplary embodiments.

A suspension system for a vehicle according to various exemplary embodiments of the present invention includes a knuckle K, an upper control arm UCA, a lower control arm LCA, a compliance control arm CCA, and an assist arm AA. The suspension system also includes a damping device including a coil spring and a shock absorber.

A suspension system for a vehicle according to various exemplary embodiments of the present invention is not limited to a specific double wishbone type suspension, but may be applicable to another type of suspension, e.g., a MacPherson strut type suspension or a wishbone type suspension, having a lower control arm (or a lower arm) LCA to which a compliance control arm CCA is applicable.

The knuckle K rotatably supports a wheel WH.

The upper control arm UCA may be formed as a single arm or two arms, and is realized as an A-arm in the various exemplary embodiments of the present invention.

The upper control arm UCA is mounted in a vehicle's width direction. A wheel-side end portion of the upper control arm UCA is connected to an upper end portion of the knuckle K to form an upper external joint 2, and a vehicle body side both vehicle body-side end portions is connected to a vehicle body in a vehicle length direction to form a front upper inner joint 4 and a rear upper inner joint 6.

The lower control arm LCA may be formed as a single arm or two arms, the same as in the upper control arm UCA, and is realized as an A-arm in the various exemplary embodiments of the present invention.

Although the various exemplary embodiments of the present invention utilizes an A-arm as the lower control arm LCA, it may be understood that the present invention is not limited thereto, and the compliance control arm CCA may be applicable to an H-arm having two connection points at a knuckle side and two connections points at a vehicle body side thereof.

The lower control arm LCA is mounted in a vehicle's width direction. A wheel-side end portion of the lower control arm LCA is connected to a lower portion of the knuckle K through a lower external joint 8. A vehicle body-side rear end portion among two vehicle body-side end portions of the lower control arm LCA is connected to the vehicle body through a front lower inner joint 10.

The lower control arm LCA is mounted in a vehicle's width direction. The compliance control arm CCA is connected to a vehicle body-side front end portion among two vehicle body-side end portions of the lower control arm LCA, through two compliance joints 14 and 16 vertically spaced apart. A vehicle body-side end portion of the compliance control arm CCA is connected to the vehicle body through a rear lower inner joint 12.

The two compliance joints 14 and 16 include an upper compliance joint 14 and a lower compliance joint 16. The vehicle body-side rear end portion of the lower control arm LCA and the wheel-side end portion of the compliance control arm CCA is interconnected to each other through the upper and lower compliance joints 14 and 16.

In more detail, the rear lower inner joint 12 is formed at the vehicle body-side end portion of the compliance control arm CCA, and the compliance control arm CCA is connected to the vehicle body through the front lower inner joint 10.

A wheel-side end portion of the compliance control arm CCA is bifurcated from the vehicle body-side end portion and forms the upper and lower compliance joints 14 and 16 that are vertically spaced apart.

A connection member 30 is fixed to the vehicle body-side front end portion of the lower control arm LCA, and the connection member 30 includes two connection portions 31 and 33 vertically spaced apart.

The compliance control arm CCA is connected to two connection portions 31 and 33 of the connection member 30 through the upper and lower compliance joints 14 and 16. The upper and lower compliance joints 14 and 16 form an axis S, and the compliance control arm CCA and the lower control arm LCA may relatively move about the axis S.

The upper and lower compliance joints 14 and 16 may be respectively formed as ball joints, however, are not limited thereto. Another element such as a bushing which may deform to vary an angle between the lower control arm LCA and the compliance control arm CCA about the axis S may be applicable as the upper and lower compliance joints 14 and 16.

The assist arm AA may be formed as a single arm. The assist arm AA is mounted at a rear portion of the knuckle K and mounted in a vehicle's width direction. A wheel-side end portion of the assist arm AA is connected to a rear middle portion of the knuckle K through an external joint 18. A vehicle body-side end portion of the assist arm AA is connected to the vehicle body through an inner joint 20.

Each of the joints may be realized as a bushing or a ball joint. In an exemplary embodiment of the present invention, the drawings illustrate that ball joints are used for external joints 2, 8, and 18 of the upper control arm UCA, the lower control arm LCA, and the assist arm AA, and the upper and lower compliance joints 14 and 16.

Furthermore, the drawings illustrate that bushings are used for inner joints 4, 6, 12, and 20 of the upper control arm UCA, the lower control arm LCA, and the assist arm AA and the rear inner joint 12 of the compliance control arm CCA.

As known in the art, a bushing includes a rubber material fitted between internal and external pipes of smaller and larger diameters, and such a bushing absorbs a load exerted to the wheel in length and width directions of a vehicle by deforming of the rubber material.

As known in the art, a ball joint includes a stud having a metal ball integrally formed with a rod and a socket spherically contacting with the metal ball. In such a ball joint, the metal ball is rotatable with respect to the socket to provide relative motion of portions linked by the ball joint, and provides high strength against an applied force.

It may be understood that the only difference of the various exemplary embodiments in comparison with the various exemplary embodiments is the arrangement location of the compliance control arm CCA.

Figure 5:
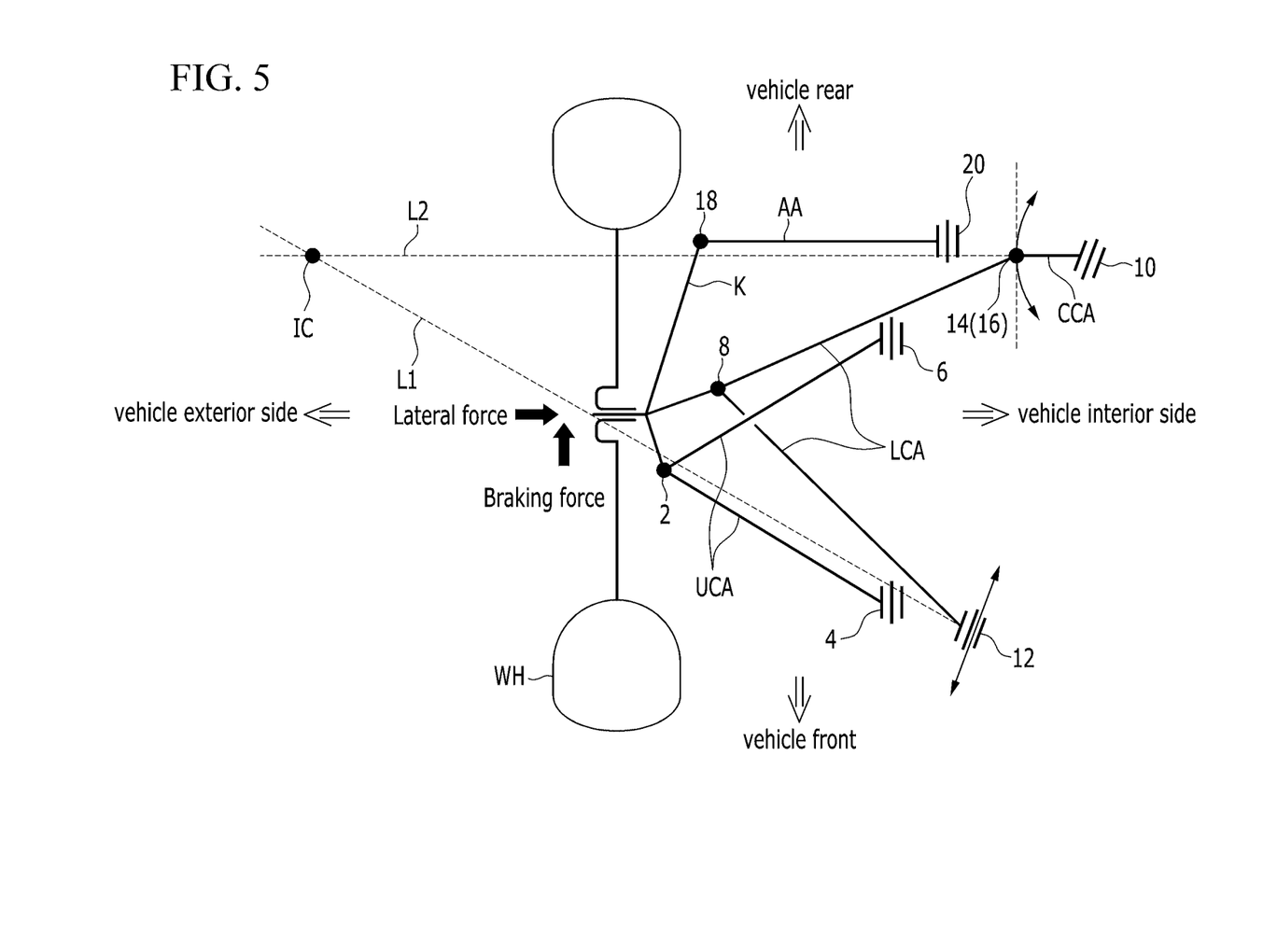
FIG. 5 is a schematic plan view of a suspension system for a vehicle according to various exemplary embodiments of the present invention.
Figure 6:
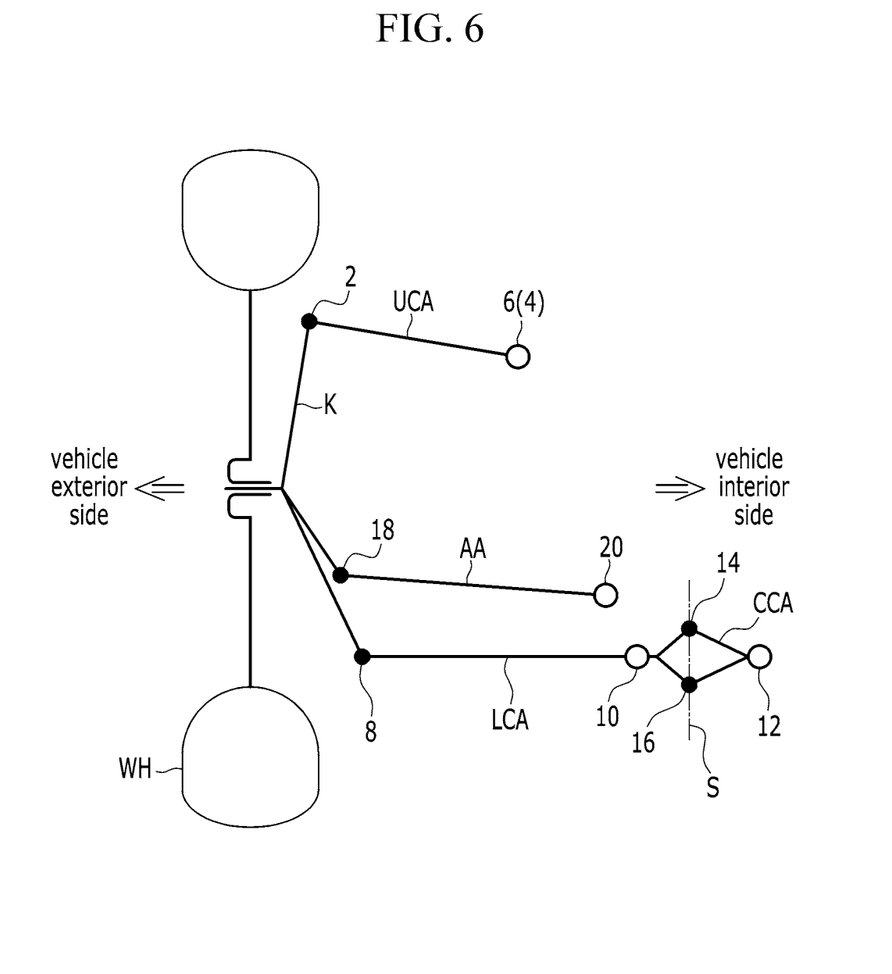
FIG. 6 is a schematic front view of a suspension system for a vehicle according to various exemplary embodiments of the present invention.

FIG. 5 is a schematic plan view of a suspension system for a vehicle according to various exemplary embodiments of the present invention. FIG. 6 is a schematic front view of a suspension system for a vehicle according to various exemplary embodiments of the present invention.

Referring to FIG. 5 and FIG. 6, compliance dynamic characteristics of the wheel WH may be estimated based on the instantaneous rotation center IC of the lower control arm LCA, as in the various exemplary embodiments. To increase tow-in behavior characteristics of the wheel WH while the lateral force and the braking force act on the wheel WH, an instantaneous rotation center IC of the lower control arm LCA is located external rear of the wheel WH.

The instantaneous rotation center IC of the lower control arm LCA is determined by the arrangement direction of the front lower inner joint 10 and the arrangement direction and location of the compliance control arm CCA.

The front lower inner joint 10 forming the front-side connection portion to the vehicle body may move along an axial direction of a bushing mounted therein, as illustrated by a straight arrow across the front lower inner joint 10. That is, the front lower inner joint 10 instantaneously moves vertically to an extension line L1 formed vertical to the axial direction of the front lower inner joint 10.

The upper and lower compliance joints 14 and 16 may rotationally move around the rear lower inner joint 12 which is a rear-side connection portion to the vehicle body. That is, the upper and lower compliance joints 14 and 16 may move in a direction perpendicular to a plane formed by the upper and lower compliance joints 14 and 16 and the rear lower inner joint 12, as illustrated by an arrow across the upper and lower compliance joints 14 and 16. That is, the upper and lower compliance joints 14 and 16 instantaneously move vertically to an extension line L2 formed by the compliance control arm CCA.

When an external force such as a lateral force or a braking force is applied to wheel WH, the lower control arm LCA may move according to compliance dynamic characteristics determined by the front-side and rear-side connection portions to the vehicle body.

In the instant case, the instantaneous rotation center IC of the lower control arm LCA is formed at a point where the two extension lines L1 and L2.

As described above, according to a suspension system for a vehicle according to various exemplary embodiments of the present invention, by appropriately designing an arrangement direction of the front lower inner joint 10 and an arrangement direction of the compliance control arm CCA, the instantaneous rotation center IC of the lower control arm LCA may be located to a desired location, the same as in the various exemplary embodiments. Furthermore, desired compliance dynamic characteristics of the wheel WH may be obtained by appropriately locating the instantaneous rotation center IC of the lower control arm LCA.

When the wheel WH experience a vertical movement causing low deformation of bushings as in bounce and rebound motion, a relative motion between the lower control arm LCA and the compliance control arm CCA is not caused.

Therefore, according to a suspension system for a vehicle according to various exemplary embodiments of the present invention, a compliance behavior of a vehicle may be improved without altering vertical kinematic behavior of the wheel WH.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A suspension system for a vehicle, the suspension system comprising:
   a knuckle configured of rotatably supporting a wheel; and
   at least one control arm configured to be mounted along a vehicle's width direction and connecting the knuckle and a vehicle body, the at least one control arm including a lower control arm mounted between the knuckle and the vehicle body,
   wherein the lower control arm includes:
      a first end portion connected to a lower portion of the knuckle through a lower external joint;
      a second end portion connected to the vehicle body through a front lower inner joint; and
      a third end portion connected to the vehicle body through a rear lower inner joint;
   wherein one of the second end portion and the third end portion of the lower control arm is connected to the vehicle body through a compliance control arm,
   wherein the second end portion of the lower control arm is connected to the front lower inner joint by the compliance control arm,
   wherein a first end portion of the compliance control arm is connected to the vehicle body through the front lower inner joint,
   wherein the second end portion of the lower control arm includes a first connection portion and a second connection portion bifurcated from the second end portion of the lower control arm, and
   wherein a second end portion of the compliance control arm includes first and second compliance joints and the first compliance joint of the compliance control arm is pivotally connected to the first connection portion of the lower control arm and the second compliance joint of the compliance control arm is pivotally connected to the second connection portion of the lower control arm.

2. The suspension system of claim 1,
   wherein the rear lower inner joint and the compliance control arm are aligned such that an instantaneous rotation center of the lower control arm is located external and rearward of a wheel center.

3. The suspension system of claim 1,
   wherein the first and second compliance joints include upper and lower compliance joints that are vertically apart with respect to each other.

4. The suspension system of claim 3,
   wherein the lower control arm and the compliance control arm rotate with respect to each other around an axis connecting the upper and lower compliance joints.

5. The suspension system of claim 1,
wherein each of the first and second compliance joints includes a ball joint or a bushing.

6. The suspension system of claim 1,
wherein the lower control arm is formed as an A-arm by the first, second and third end portions of the lower control arm.

7. The suspension system of claim 1,
wherein each of the front lower inner joint and the rear lower inner joint includes a bushing or a ball joint.

8. The suspension system of claim 1,
wherein the at least one control arm further includes an upper control arm mounted above the lower control arm.

9. The suspension system of claim 8, wherein the upper control arm includes:
   a first end portion connected to an upper portion of the knuckle through an upper external joint;
   a second end portion connected to the vehicle body through a front upper inner joint; and
   a third end portion connected to the vehicle body through a rear upper inner joint.

10. A suspension system for a vehicle, the suspension system comprising:
    a knuckle configured of rotatably supporting a wheel; and
    at least one control arm configured to be mounted along a vehicle's width direction and connecting the knuckle and a vehicle body, the at least one control arm including a lower control arm mounted between the knuckle and the vehicle body,
    wherein the lower control arm includes:
      a first end portion connected to a lower portion of the knuckle through a lower external joint;
      a second end portion connected to the vehicle body through a front lower inner joint; and
      a third end portion connected to the vehicle body through a rear lower inner joint,
    wherein one of the second end portion and the third end portion of the lower control arm is connected to the vehicle body through a compliance control arm, and
    wherein the third end portion of the lower control arm is connected to the rear lower inner joint by the compliance control arm.

11. The suspension system of claim 10,
wherein a first end portion of the compliance control arm is connected to the vehicle body through the rear lower inner joint,
wherein the third end portion of the lower control arm includes a first connection portion and a second connection portion bifurcated from the third end portion of the lower control arm, and
wherein a second end portion of the compliance control arm includes first and second compliance joints and the first compliance joint of the compliance control arm is pivotally connected to the first connection portion of the lower control arm and the second compliance joint of the compliance control arm is pivotally connected to the second connection portion of the lower control arm.

12. The suspension system of claim 11,
wherein the front lower inner joint and the compliance control arm are aligned such that an instantaneous rotation center of the lower control arm is located external and rearward of a wheel center.

13. The suspension system of claim 11,
wherein the first and second compliance joints include upper and lower compliance joints that are vertically apart with respect to each other.

14. The suspension system of claim 13,
wherein the lower control arm and the compliance control arm relatively rotate with respect to each other around an axis connecting the upper and lower compliance joints.

15. The suspension system of claim 11,
wherein each of the first and second compliance joints includes a ball joint or a bushing.

16. The suspension system of claim 10,
wherein the lower control arm is formed as an A-arm by the first, second and third end portions of the lower control arm.

17. The suspension system of claim 10,
wherein each of the front lower inner joint and the rear lower inner joint includes a bushing or a ball joint.

18. The suspension system of claim 10,
wherein the at least one control arm further includes an upper control arm mounted above the lower control arm, and
wherein the upper control arm includes:
   a first end portion connected to an upper portion of the knuckle through an upper external joint;
   a second end portion connected to the vehicle body through a front upper inner joint; and
   a third end portion connected to the vehicle body through a rear upper inner joint.

* * * * *